No. 774,209. PATENTED NOV. 8, 1904.
Q. STUBBS.
PLEASURE WHEEL.
APPLICATION FILED NOV. 12, 1903.
NO MODEL. 2 SHEETS—SHEET 1.

No. 774,209. PATENTED NOV. 8, 1904.
Q. STUBBS.
PLEASURE WHEEL.
APPLICATION FILED NOV. 12, 1903.
NO MODEL. 2 SHEETS—SHEET 2.

Witnesses
Elena Pritchard
O. M. Rogers

Inventor
Quincy Stubbs
by Alfred M. Allen
Attorney

No. 774,209. Patented November 8, 1904.

UNITED STATES PATENT OFFICE.

QUINCY STUBBS, OF CINCINNATI, OHIO.

PLEASURE-WHEEL.

SPECIFICATION forming part of Letters Patent No. 774,209, dated November 8, 1904.

Application filed November 12, 1903. Serial No. 180,872. (No model.)

*To all whom it may concern:*

Be it known that I, QUINCY STUBBS, a citizen of the United States, residing in Cincinnati, county of Hamilton, State of Ohio, have invented certain new and useful Improvements in Pleasure-Wheels, of which the following is a full, clear, and exact description, reference being had to the accompanying drawings, forming part of this specification.

My improvements relate to wheels of very large diameter arranged to rotate vertically and to carry suspended within the periphery of the wheel cars or baskets for the entertainment of passengers occupying the cars.

The improvements consist of certain novel construction and arrangement of parts, to be hereinafter particularly pointed out and claimed, whereby the wheel may be driven by falling water.

Figure 1:
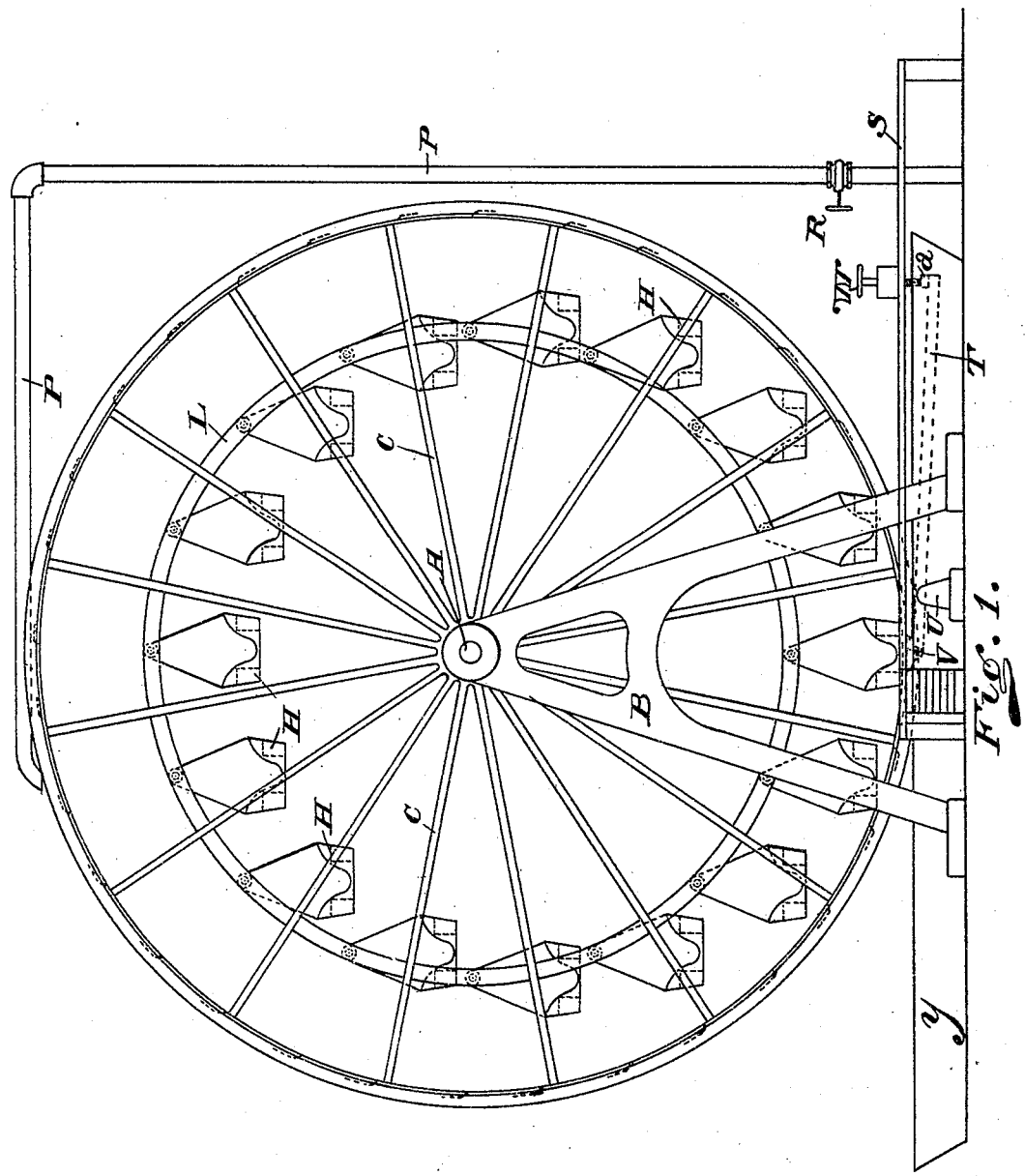
Figure 2:
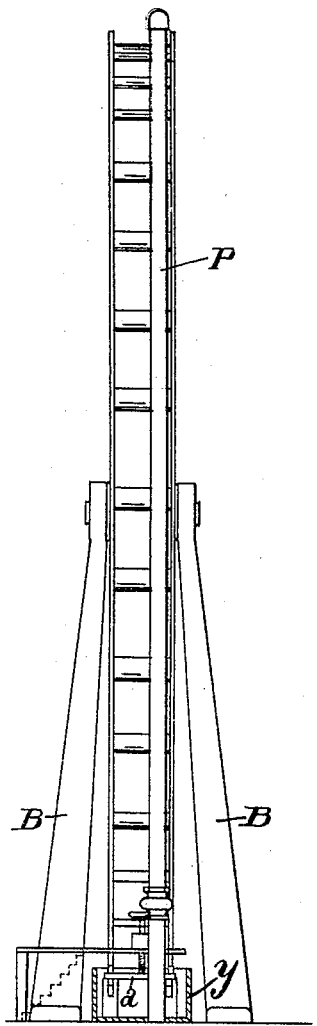
Figure 3:
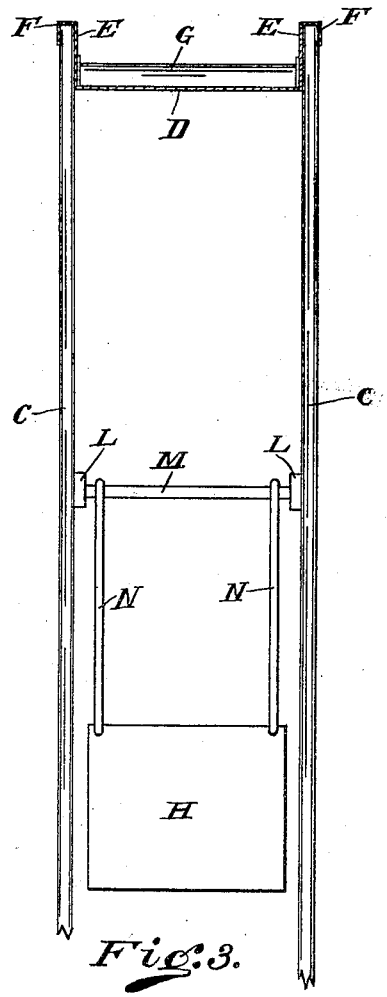
Figure 4:
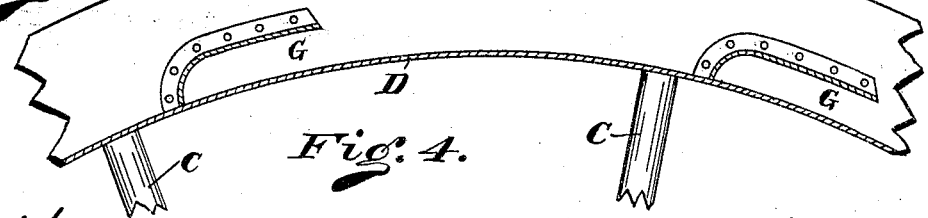

In the drawings, Figure 1 is a side elevation of my improved pleasure-wheel. Fig. 2 is an end elevation of same. Fig. 3 is a sectional elevation of a portion of the periphery of the wheel, showing the method of suspending the cars. Fig. 4 is a detail vertical section of the rim of the wheel, showing the water-buckets.

A massive wheel is constructed of large diameter—say from seventy-five (75) to one hundred (100) feet—which is mounted to rotate vertically on the axle A, journaled in the massive supports or standards B B.

C C are the spokes of the wheel arranged in parallel pairs about four or five feet apart, and upon the outer end of the spokes is secured the rim D of the wheel, which is constructed water-tight and continuous. This rim is provided with side flanges E, which project a foot or more on each side beyond the outer surface of said rim, and F F are angle-plates secured on the outer end of the spokes to form an outer flange for the rim on each side, said rim serving both as a support for the buckets and as a shield for protecting the passenger cars or carriages from dripping water.

At convenient distances on the outside of the rim of the wheel are secured buckets G G, which extend across the rim of the wheel from side to side and are bolted to the flanges E of the rim. These buckets are preferably about four inches wide and twelve inches deep, and as many buckets are provided as may be necessary to properly drive the wheel.

Secured within the periphery of the wheel at a convenient distance not to interfere with the movement of the cabs H are the bands L L, which are securely bolted to the spokes. M M are cross-bars secured to these bands between the spokes. The carriages or baskets H H are swung on the cross-bars M by suitable rods N N.

In order to rotate the wheel, water is supplied at the top through the pipe P, of sufficient size to deliver water for filling the buckets G and rotating the wheel. The supply of water is controlled by a suitable valve R within convenient reach of the operator on the platform S, which platform is raised sufficiently above the ground to permit convenient access of passengers into the carriages H when the wheel is stopped with the carriage to be occupied at the bottom.

In order to control the rotation of the wheel when the water has been cut off, I provide a brake which consists of a pair of levers T, secured together by cross-braces and mounted on a suitable fulcrum-support U and carrying at the short end of the levers the brake-shoes V, arranged to contact with the outer surface of the angle-plates F. These levers are operated by a hand-wheel W and screw, which bears against the outer cross-bar $a$, connecting the levers, so that by operating the hand-wheel the pleasure-wheel can be stopped at any desired point.

Y is a trough underneath the wheel to receive and carry off the water as it is discharged by the buckets.

The carriages are secured, as described, on the cross-bars between the bands L L in order that each carriage when it reaches the bottom will swing between the spokes C C of the wheel in order that free access may be had to the carriages.

Instead of providing a trough Y to receive the water discharged from the wheel the wheel itself may be mounted over any lake or artificial body of water that may be accessible where it is desired to erect the wheel. In such artificial lakes at pleasure resorts it is necessary to supply water constantly to the lake and provide for its discharge to prevent the water from becoming stagnant. This supply of water may be utilized, as will be readily understood, for driving the pleasure-wheel, so that there will not be any extra waste of water other than would be necessary for the artificial lake.

Having thus described my invention, what I claim, and desire to secure by Letters Patent, is—

1. A pleasure-wheel comprising in combination, a vertically-mounted wheel, water-buckets carried thereby, and passenger cars or carriages pivotally supported between said buckets and the axis of the wheel.

2. In a pleasure-wheel, the combination of a vertically-mounted wheel, buckets carried by said wheel adapted to receive water from a suitable source for propelling said wheel, passenger cars or carriages pivotally supported by said wheel between said buckets and the wheel-axis, and a shield between said buckets and said cars.

3. A pleasure-wheel comprising in combination, an overshot water-wheel, passenger cars or carriages pivotally supported by said wheel between the water propelling buckets or blades and the axis of the wheel, and a shield between said buckets and said carriages.

4. A pleasure-wheel comprising in combination a vertically-mounted wheel having a broad rim, said rim being provided with upturned flanges, water-buckets mounted on said rim between said flanges, and passenger cars or carriages pivotally supported by said wheel between said rim and the axis of the wheel.

QUINCY STUBBS.

Witnesses:
O. M. ROGERS,
WM. C. PEIRCE.